US005800143A

United States Patent [19]

Bravo

[11] Patent Number: 5,800,143

[45] Date of Patent: Sep. 1, 1998

[54] ANCHORING FRAME FOR CONTAINMENT BOX

[76] Inventor: Sergio M. Bravo, 2872 Tigertail Dr., Los Alamitos, Calif. 90720

[21] Appl. No.: 710,765

[22] Filed: Sep. 20, 1996

[51] Int. Cl.[6] .............................. E02B 13/00; B09B 3/00

[52] U.S. Cl. .................................. 405/52; 52/20; 141/86; 404/25; 405/128

[58] Field of Search ..................... 405/52, 128; 141/186, 141/188; 137/312; 404/25.26; 52/19, 20

[56] References Cited

U.S. PATENT DOCUMENTS

| | | | |
|---|---|---|---|
| 4,505,814 | 3/1985 | Marshall | 404/26 X |
| 4,842,163 | 6/1989 | Bravo | 222/40 |
| 4,989,634 | 2/1991 | Rieseck | 137/312 X |
| 5,040,408 | 8/1991 | Webb | 73/40.5 R |
| 5,058,633 | 10/1991 | Sharp | 404/25 X |
| 5,058,854 | 10/1991 | Bravo | 249/2 |
| 5,246,044 | 9/1993 | Robertson et al. | 404/25 X |
| 5,257,652 | 11/1993 | Lawrence | 137/312 X |
| 5,412,911 | 5/1995 | Schlegel | 404/25 X |
| 5,628,152 | 5/1997 | Bowman | 404/25 X |

OTHER PUBLICATIONS

Containmnent Technologies Corporation, "PERMA--FLEXX" brochure (4 pages).

Environ Products, Inc., "The GeoFlex System" (4 pages).

Bravo Systems, "Bravo's Underground Answer for Environmentally Conscious Fuel Dispensing" (6 pages).

Environ, "Environ Safe Products" brochure (5 pages).

Total Containment, "U.S. Price Manual" (3 pages).

*Primary Examiner*—Dennis L. Taylor

*Attorney, Agent, or Firm*—Christie, Parker & Hale, LLP

[57] ABSTRACT

A containment box and anchor frame assembly is provided for anchoring a containment box at a gasoline service station to either a concrete island, or to the paved driveway of a gasoline service station. The anchor frame is fastened to the upper opening of the containment box and includes a plurality of outwardly extending anchoring brackets for securing the anchor frame to the surrounding concrete. The anchor frame helps to keep the containment box from being damaged if a product dispenser is hit by a vehicle. The assembly also includes a dispenser frame for mounting a product dispenser to the anchor frame. The anchor frame is of a universal design such that a particular size of containment box and anchor frame assembly can receive a number of different sizes of dispenser frames so that different sizes of dispensers can all be mounted to the same containment box and anchor frame assembly. This avoids the need for maintaining a high inventory of different containment box and anchor frame assemblies, each sized for receiving different fuel dispensers. It also permits the simple modification of a particular service station facility to accommodate a different style of dispenser without the need for extensive and expensive modifications to an existing containment box.

18 Claims, 7 Drawing Sheets

ANCHORING FRAME FOR CONTAINMENT BOX

FIELD OF THE INVENTION

The present invention relates to a frame assembly for anchoring a containment box of the type used for the secondary containment of fluid spills at a gasoline service station. More specifically, it relates to a frame assembly that is useful for fuel dispensers that can be mounted at ground level or on a dispenser island. The frame assembly is also useful in that it includes a dispenser frame design that permits a single containment box to be used with a number of different fuel dispensers.

BACKGROUND OF THE INVENTION

Gasoline service stations typically include a number of islands upon which product dispensers are mounted. Beneath each product dispenser is a containment box penetrated by a product supply line which feeds product to the dispenser. The containment box is intended to contain any leakage of product from the dispenser in the event of a failure of the piping or other equipment located within the dispenser.

The top of a containment box typically has a dispenser frame that includes an outwardly extending flange upon which the base of the dispenser is mounted. The dispenser frame can be formed as an integral part of the containment box, or it can be a separate unit that is permanently attached to the containment box such as by rivets. A typical prior art containment box has an integral flange extending around the top of its perimeter. This flange is generally mounted flush with the concrete that forms a conventional service station island. A length of reinforcing angle stock is often attached to the containment box a few inches below the flange to help anchor the containment box in the concrete.

Since a conventional island upon which a product dispenser is mounted is raised several inches above the driveway surface at a service station, it is unlikely that a customer will accidently drive his or her car over the curb that surrounds the island and into a dispenser. Nonetheless, such accidents periodically occur and the product piping within the containment box and the dispenser includes safety equipment to prevent any significant discharge of product in the event that a customer hits a dispenser and breaks a product line. However, while the currently used safety equipment is effective at avoiding significant fuel discharge, in the event that a car does hit a dispenser, the dispenser frame and containment box can be seriously damaged. Repair of a damaged dispenser frame and containment box typically requires that at least a portion of the concrete that forms the island be broken apart so that either a new dispenser frame can be installed, or the existing dispenser frame can be bent back to its original shape. In some instances, the entire containment box must be removed and replaced. Once the dispenser frame is repaired, the island must then be repaired or replaced. Even though such repairs are infrequently required, they can nonetheless be quite expensive and can require lengthy shutdowns at the service station.

Furthermore, while product dispensers have traditionally been mounted on islands, there is a growing trend for service stations to include at least one dispenser that is mounted at ground level. By mounting at least one dispenser at ground level, individuals with physical disabilities are able to more conveniently access the dispenser. Conventional dispensers that are mounted on an island can be quite difficult for disabled customers to use, especially for those customers confined to wheelchairs.

One drawback to mounting a conventional containment box at ground level is that without the protection of a dispenser island there is an increased risk that a customer may accidently drive into the dispenser and damage the dispenser frame and containment box. As pointed out above, once a conventional dispenser frame or containment box is bent, significant downtime of the dispenser is generally required while expensive repairs are made. Steel poles and other barriers can be provided to reduce the damage to a ground level dispenser and its associated equipment in the event that a customer hits the dispenser, however, the use of such barriers can make access to the dispensers more difficult. Since the fundamental purpose of a ground level dispenser is to provide ease of access for disabled customers, the installation of any barriers or other equipment that might block access to the dispenser is to be avoided.

Another drawback to the design of conventional containment boxes is that there is no consistency among the many dispenser manufacturers in the size and shape of the base of their dispensers. Even for a single dispenser manufacturer, there can be different models of dispensers of different sizes. As a result, each different dispenser requires a specifically designed containment box and dispenser frame. Consequently, the companies that manufacture containment boxes have to keep a large inventory of containment boxes on hand to meet the demands of their customers.

Furthermore, if a service station owner chooses to replace the station's existing dispensers with a different model dispenser or dispensers made by a different manufacturer, either replacement of the existing containment boxes, or expensive modifications to the existing containment boxes may be required. In either case, a portion of the concrete around the containment boxes typically has to be broken up, removed and replaced to permit the replacement or modification of the containment boxes. While some conversion frames are available for allowing a different dispenser to be mounted on an existing dispenser frame, such frames require that the new dispenser be mounted higher than the old dispenser. This is often unsatisfactory and may even violate regulatory requirements directed to the height of a dispenser.

SUMMARY OF THE INVENTION

The present invention provides a containment box assembly with an anchor frame for anchoring a containment box to either a concrete island, or the concrete driveway of a gasoline service station. The anchor frame is preferably fabricated of steel in a rectangular shape sized to fit inside a flared top opening of a rectangular containment box. A plurality of anchoring brackets are provided to extend outwardly from the anchor frame to anchor the assembly in the surrounding concrete.

The containment box assembly also includes a dispenser frame. The dispenser frame is a rectangular frame with a lower flange portion extending around its outer perimeter. The flange permits both attachment of a product dispenser to the dispenser frame and the attachment of the dispenser frame to the anchor frame at an upper lip on the anchor frame.

In order to install the containment box of the present invention, the anchor frame is first attached to the box portion. An appropriate dispenser frame is then selected to fit the desired dispenser and attached to the anchor frame. The combined containment box, anchor frame and dispenser frame are then placed in the appropriate location at the service station and all necessary piping connections are made. The containment box and anchor frame should be placed an appropriate depth in the ground so that the top of the anchor frame and the bottom of the flange of the dispenser frame are level with either the top of the island for an island installation, or with the driveway surface for a ground level installation. The concrete for either the island or the driveway, depending on the type of installation, is then poured around the anchor frame. A product dispenser is then mounted to the dispenser frame.

In the event that a car accidentally hits a product dispenser that has been mounted on a containment box with an anchor frame and dispenser frame of the present invention, the product dispenser and dispenser frame are likely to be sheared from the anchor frame, but generally neither the anchor frame nor the containment box will be harmed. Therefore, the dispenser frame can be replaced along with the damaged dispenser without the need for breaking up the surrounding concrete to repair or replace the anchor frame or containment box.

Another benefit of the present invention is that a combined containment box and anchor frame of a particular size and shape can accommodate a number of different sizes and shapes of dispenser frames. Each dispenser frame can accommodate a particular dispenser. This permits a containment box manufacturer to meet its customers' demands with a lower inventory of containment boxes and anchor frames than was previously possible. While many different dispenser frames may need to be maintained in inventory, the dispenser frames are both easier to fabricate and easier to store than containment boxes designed for a particular size of dispenser.

Of course, while the above design is directed to containment boxes and anchor frames provided as separate components, containment boxes with integral anchor frames of the above design for use with a variety of dispenser frames may also be provided. Moreover, while the anchor frame described above is particularly useful where a product dispenser is to be mounted at ground level, such an anchor frame is also useful for dispensers mounted on conventional dispenser islands.

BRIEF DESCRIPTION OF THE DRAWINGS

Other features, aspects, and advantages of the present invention will be more fully understood when considered with respect to the following detailed description, appended claims, and accompanying drawings where:

DETAILED DESCRIPTION

Figure 1:
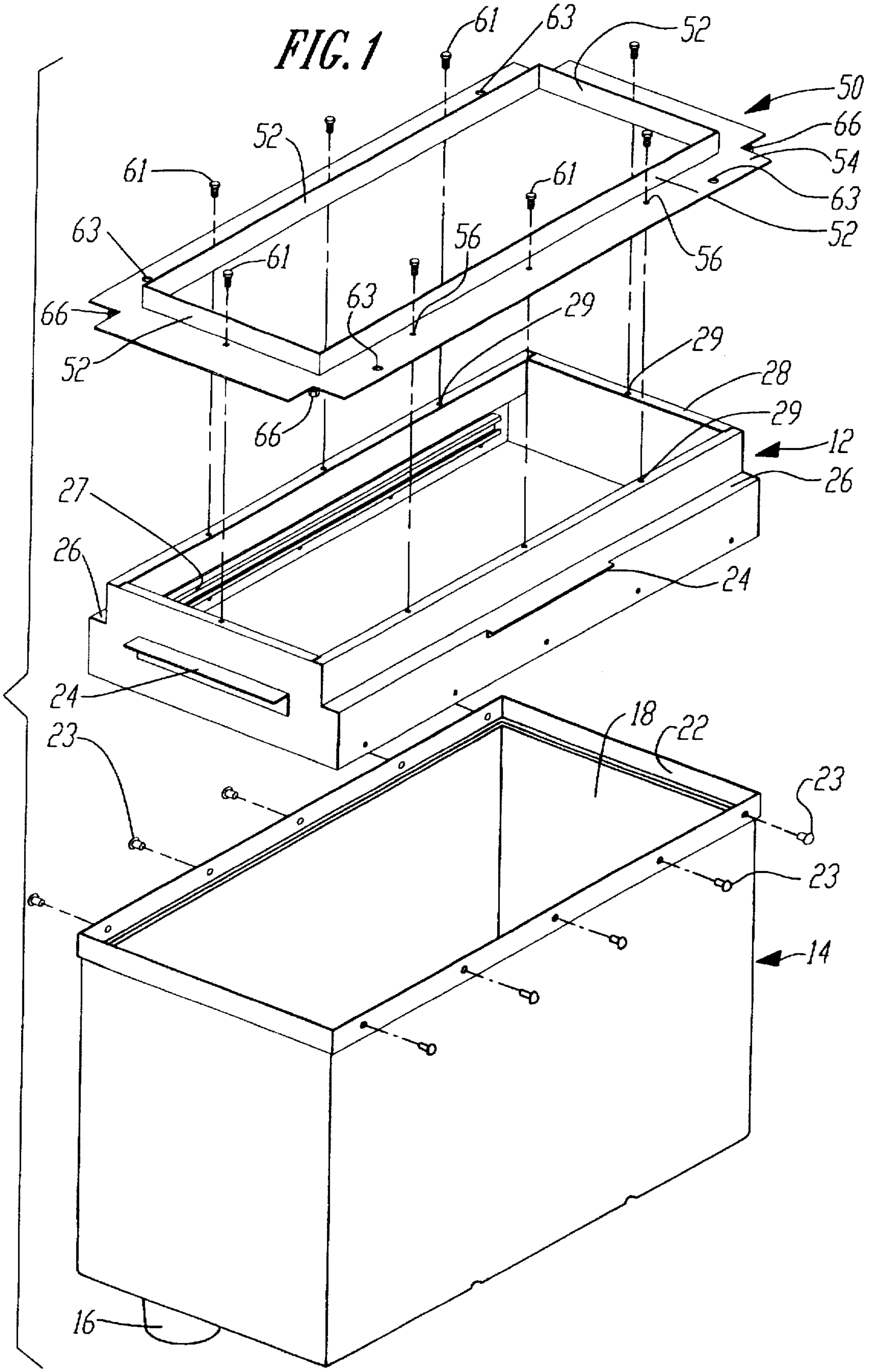
FIG. 1 is an exploded perspective view of a containment box, an anchor frame and a dispenser frame of the present invention.
Figure 2:
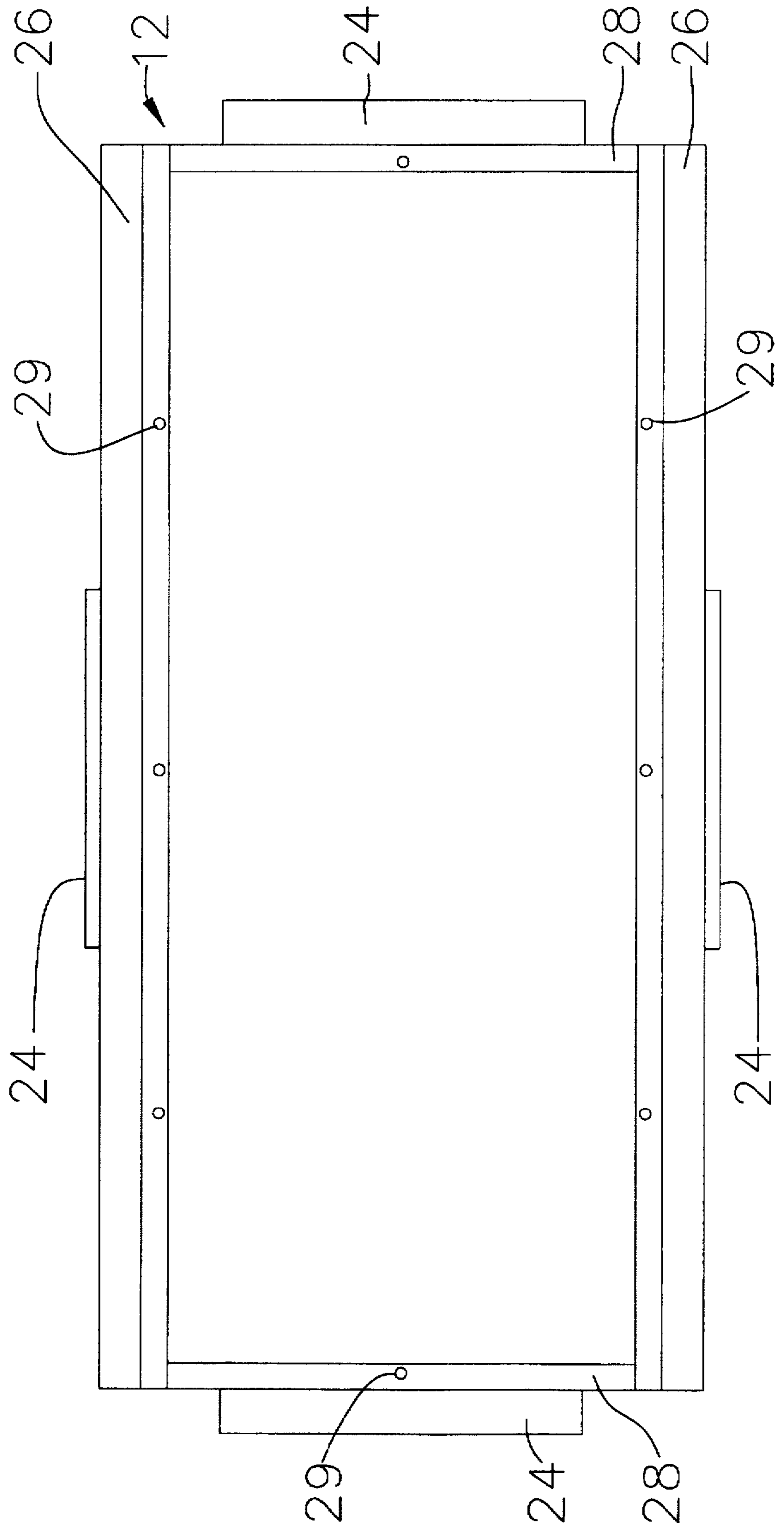
FIG. 2 is a top view of the anchor frame of the present invention.
Figure 3:
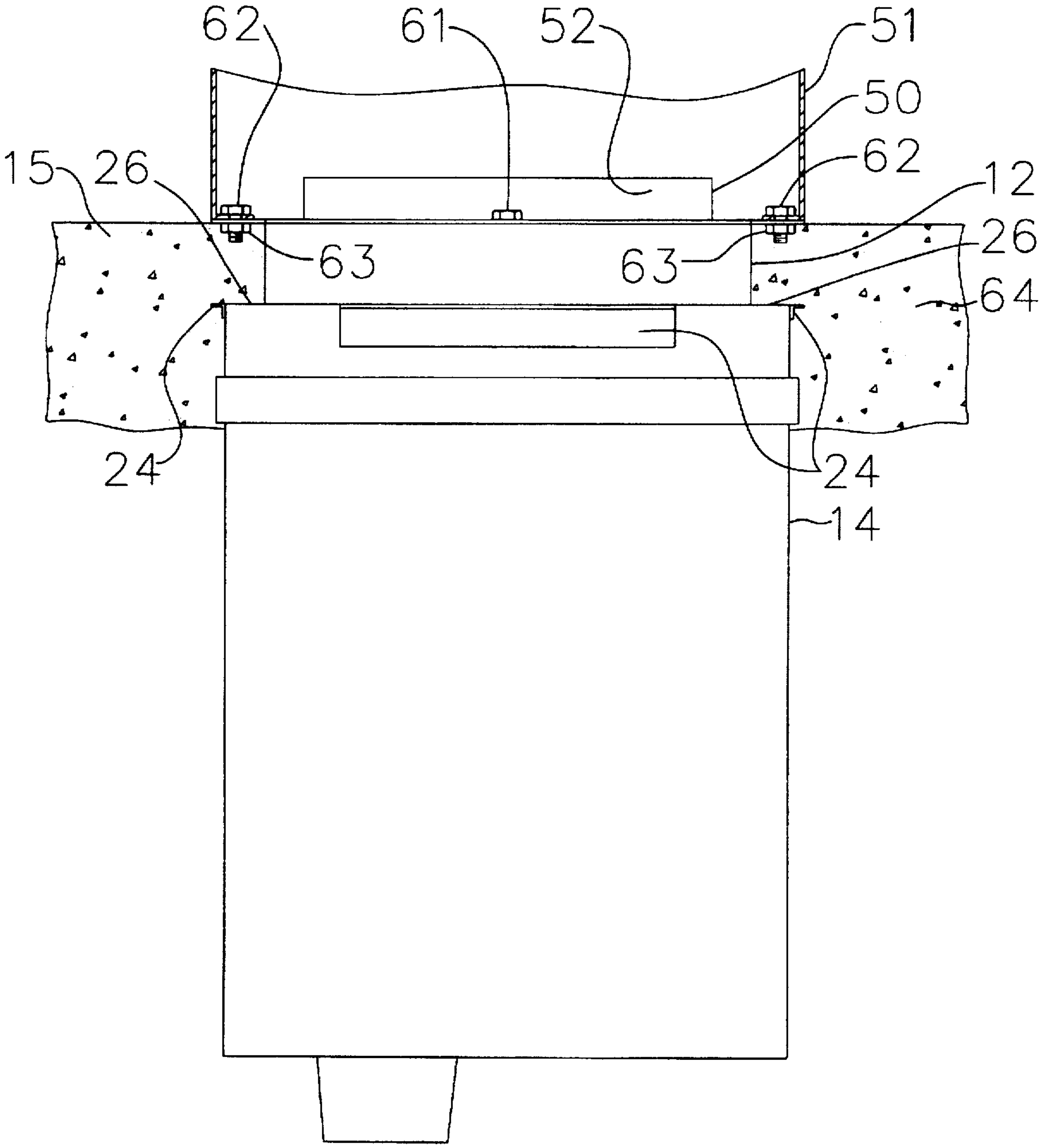
FIG. 3 is a partially cut away side view of the assembly of FIG. 1 after the anchor frame has been set in a concrete driveway.

Referring to FIGS. 1–3, a first embodiment of the invention is illustrated. It includes an anchor frame 12 for mounting on a containment box 14. The containment box is of a typical design used beneath a gasoline or other fuel dispenser in a driveway 15 at a service station. When in place, the containment box houses the pipe connections (not shown) which connect the dispenser to a product pipeline for receiving product from an underground storage tank. The containment box is intended to contain any leakage of product from the dispenser in the event there is a malfunction of the equipment and piping located in the dispenser. The particular containment box illustrated is designed for use with a three-product fuel dispenser, and therefore, includes three sumps or cups 16 for collecting any leaking product and amplifying the effect of the accumulating product as set forth in U.S. Pat. No. 4,842,163 which is incorporated herein by reference. The walls that make up the containment box define a top opening 18 through which the product lines extend to the dispenser.

The anchor frame includes four walls in a rectangular configuration sized to fit in a flared top opening 22 of the containment box. In the preferred embodiment, the anchor frame is riveted to the containment box such as with pop rivets 23. Once riveted in place, caulking is placed in the seam between the containment box and anchor frame to provide a fluid-tight seal. While rivets are the preferred means for attaching the anchor frame to the containment box, other fasteners such as nuts and bolts, or sheet metal screws can also be used. Instead of rivets or other mechanical fasteners, the anchor frame can also be bonded with adhesive or welded to the containment box. In yet another embodiment, the anchor frame is provided as an integral part of the containment box. However, the use of fasteners such as rivets permit the use of different materials for the anchor frame and the containment box. For example, the containment box can be made of fiberglass or some other lightweight composite material while the anchor frame can be made of steel.

In order to provide added strength to the containment box and to help anchor the containment box in the concrete driveway, a plurality of anchoring brackets are provided. In this embodiment, a plurality of anchor blades 24 preferably made from angle stock are attached to each of the four walls of the anchor frame as the anchoring brackets. One wall of the angle stock is attached to the wall of the anchor frame such as by welding. The other wall of the angle is oriented to extend outwardly from the anchor frame in a plane parallel to the surface of the driveway to form the anchor blade. In addition, the front and back walls of the anchor frame each include an inward step 26 wherein the opening of the anchor frame narrows. This provides additional strength to the anchor frame and permits the use of a large containment box while allowing the same anchor frame to be used with a number of different product dispensers as will be discussed in more detail below. The containment box should be large enough to permit access to the piping within the containment box in the event repairs are necessary.

The anchor frame also includes a pair of rails 27 (one shown) inside the anchor frame on its front and back walls. The rails are preferably made of channel stock with a C-shaped cross section welded to the walls of the anchor frame. The use of such rails is known in the art. Mounting rails are useful for fastening mounting bars (not shown) which extend across the containment box between the rails. The mounting bars are useful for supporting the piping within the containment box. The use of rails permits the mounting bars to be moved from side to side to accommodate the specific piping configuration for a particular dispenser. The use of a flexible pipeline in combination with the containment box and frame assembly of the present invention further simplifies modification of the piping configuration as may later be necessary to permit use of a different dispenser and dispenser frame than was originally used.

A typical inner opening size for such an anchor frame is about 40 inches by 14 inches which corresponds to a containment box of similar dimensions. Of course, other sizes may be desired such as for a containment box used with a four-product dispenser (such as is provided for dispensing three grades of gasoline and diesel fuel.) or one for a two product dispenser (for dispensing two grades of gasoline.) The perimeter of the top opening of the anchor frame also includes an inwardly facing lip 28 with a plurality of holes 29.

A dispenser frame 50 is mounted to the anchor frame to permit a product dispenser 51 to be bolted to the containment box. The dispenser frame includes four vertical frame walls 52 arranged in a rectangular shape. A lower flange 54 extends outwardly from the base of each of the frame walls in a horizontal plane at the perimeter of the rectangle defined by the frame walls. A plurality of holes 56 in the flange coincide with the holes of the anchor frame. A plurality of bolts 61 and nuts (not shown) are provided to fasten the dispenser frame to the anchor frame. Referring to FIG. 3, the dispenser frame also includes means for attaching the product dispenser to the dispenser frame. In the preferred embodiment, bolts 62 are used to fasten the dispenser to the dispenser frame at a plurality of threaded apertures 63 which are preferably nuts welded to the underside of the flange of the dispenser frame. Generally, four dispenser bolts are used to fasten the dispenser to the dispenser frame.

While only one particular dispenser frame is shown, it is clear that various different sizes of dispenser frames can be provided, each of which will fit on a common anchor frame. By producing a number of different sizes of dispenser frames that can be connected to a single size of containment box and anchor frame, a containment box manufacturer can maintain a smaller inventory of dispenser boxes than was previously possible. While several different sizes of dispenser frames may need to be kept in the manufacturer's inventory, since the dispenser frames are of a fairly simple construction and are of a fairly compact size compared to a conventional containment box with an integral dispenser frame, it is far less expensive to manufacture and store a large number of dispenser frames than a comparable number of containment boxes with integral dispenser frames.

Preferably, the various components that make up the anchor frame are fabricated from a strong and durable material such as 12 gauge steel. For the anchor frame, this permits the various components that make up the anchor frame to be welded together. As pointed out above, the containment box can be fabricated from a number of different materials including steel, fiberglass, steel lined with fiberglass, or composites. Such materials are well known in the art. The dispenser frame is preferably made of steel, but could be made of other materials as well.

Figure 4:
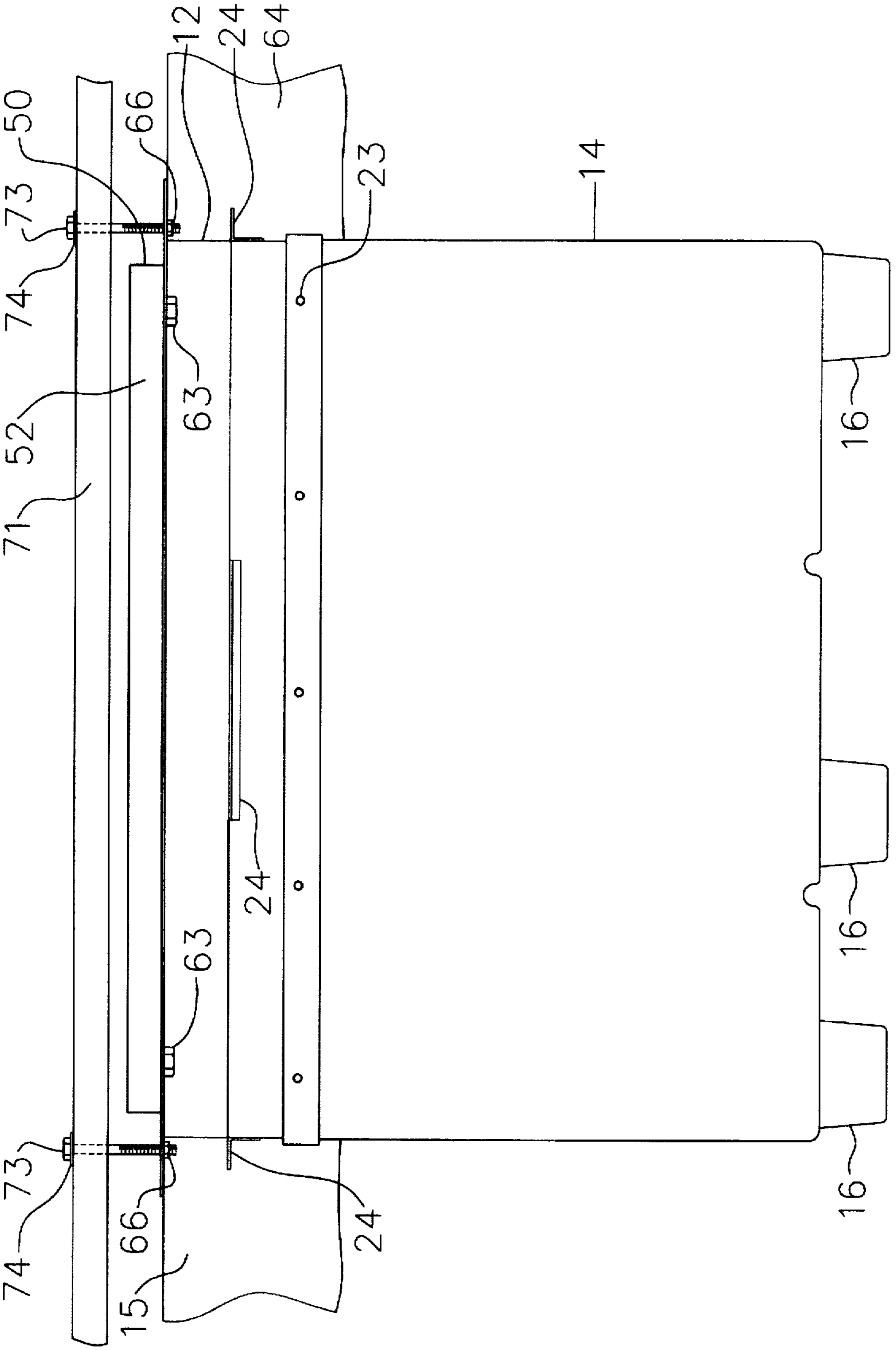
FIG. 4 is a partially cut away front view of the assembly of FIG. 1 during installation in a concrete driveway.

According to FIGS. 3 and 4, the dispenser frame, anchor frame and containment box, once attached to one another, are set in the concrete 64, or some other surfacing material, so that the top of the anchor frame is level with the top of the concrete and the dispenser frame rests on the concrete. The anchor blades of the anchor frame help to hold the assembly firmly in the concrete. During installation of the containment box and anchor frame, the four dispenser bolts should be threaded into the threaded apertures 63 so that a small void under each nut on the dispenser frame is created in the concrete. After the concrete has set, the bolts can be removed and used to attach the dispenser to the dispenser frame. In order to simplify the removal of the bolts from the concrete, the thread of each bolt should be coated with grease while the concrete is setting.

In order to protect against corrosion, any steel components of the containment box, anchor frame and dispenser frame should be painted, preferably by a powder coating process. Such processes and the materials they use are well known in the art as similar coatings are typically provided on steel containment boxes.

In order to simplify the leveling of the anchor frame during its installation in the concrete of the service station, in the preferred embodiment, the dispenser frame is provided with four leveling nuts 66 at the four corners of the dispenser frame. The use of the leveling nuts is illustrated in FIG. 4. A pair of temporary support arms 71 (one shown), such as two lengths of wooden two by four, are held suspended over the location where the anchor frame and containment box are to be installed. The temporary support arms can be suspended by the use of pieces of scrap wood, concrete blocks or various other methods to hold them a distance above the ground. Four leveling bolts 73, each with a washer 74, extend through holes in the temporary support arms and are threaded into the nuts. By tightening a particular bolt, a corner of the dispenser frame can be raised. By loosening that bolt, the corner of the dispenser frame can be lowered. The assembly is leveled by tightening or loosening the four leveling bolts as necessary. Once the assembly has been leveled, the concrete can be poured. Of course, minor adjustments can also be made in the level of the containment box immediately after the concrete has been poured but before it sets. After the concrete has partially set, the anchor frame will tend to stay in its level position while the concrete is fully curing. Therefore, the support arms and bolts can be removed before the concrete has fully set.

While the anchor frame and dispenser box are illustrated as separate components, it is clear that the two could be formed as an integral unit. Such an integral containment box and anchor frame is anchored much more firmly in the surrounding concrete than a prior art containment box making it particularly suitable for use with product dispensers that are to be mounted at ground level. Moreover, since a single design for the containment box can be used with a number of different dispenser frames to accommodate various different dispenser designs, the containment box manufacturer can maintain a reduced inventory of containment boxes, yet still satisfy its customers' demands.

According to the present invention, once a containment box assembly including an anchor frame and dispenser frame has been installed, the replacement of the dispenser frame to accommodate a different style or brand of product dispenser can be easily performed. The existing dispenser is removed along with the dispenser frame. A new dispenser frame is selected to accommodate the new dispenser and the new dispenser frame is bolted to the existing anchor frame. If necessary, holes can be drilled in the concrete before the dispenser frame is bolted in place to accommodate the dispenser mounting bolts for the new dispenser. Any changes in the piping configuration within the box can also be made easily, especially if flexible piping is used. The rails on the front and back of the anchor frame permit adjustment of the orientation of the mounting bars and the various pipelines to accommodate differences between dispenser designs.

Another important feature of the present invention is that the improved anchor frame also tends to hold the containment box in place, even if a dispenser is hit by a car. Prior art containment boxes tended to be bent and would require extensive excavation to repair or replace the damaged containment box. Furthermore, by including the dispenser frame as a separate piece located above ground, the dispenser frame will help to absorb the impact of any collision. Generally, if a dispenser is hit by a vehicle, the dispenser frame will begin to bend until the dispenser bolts shear off from the dispenser frame. However, the anchor frame and containment box should be left intact without any damage. After such a collision, the dispenser and dispenser frame can be replaced, any damaged piping repaired and the dispenser can be placed back into service without the need for excavation of the concrete at the service station in order to repair or replace the containment box. Such a feature is especially useful for dispensers mounted at ground level rather than on islands as such dispensers are more likely to be struck by vehicles than dispensers protected by islands.

Figure 5:
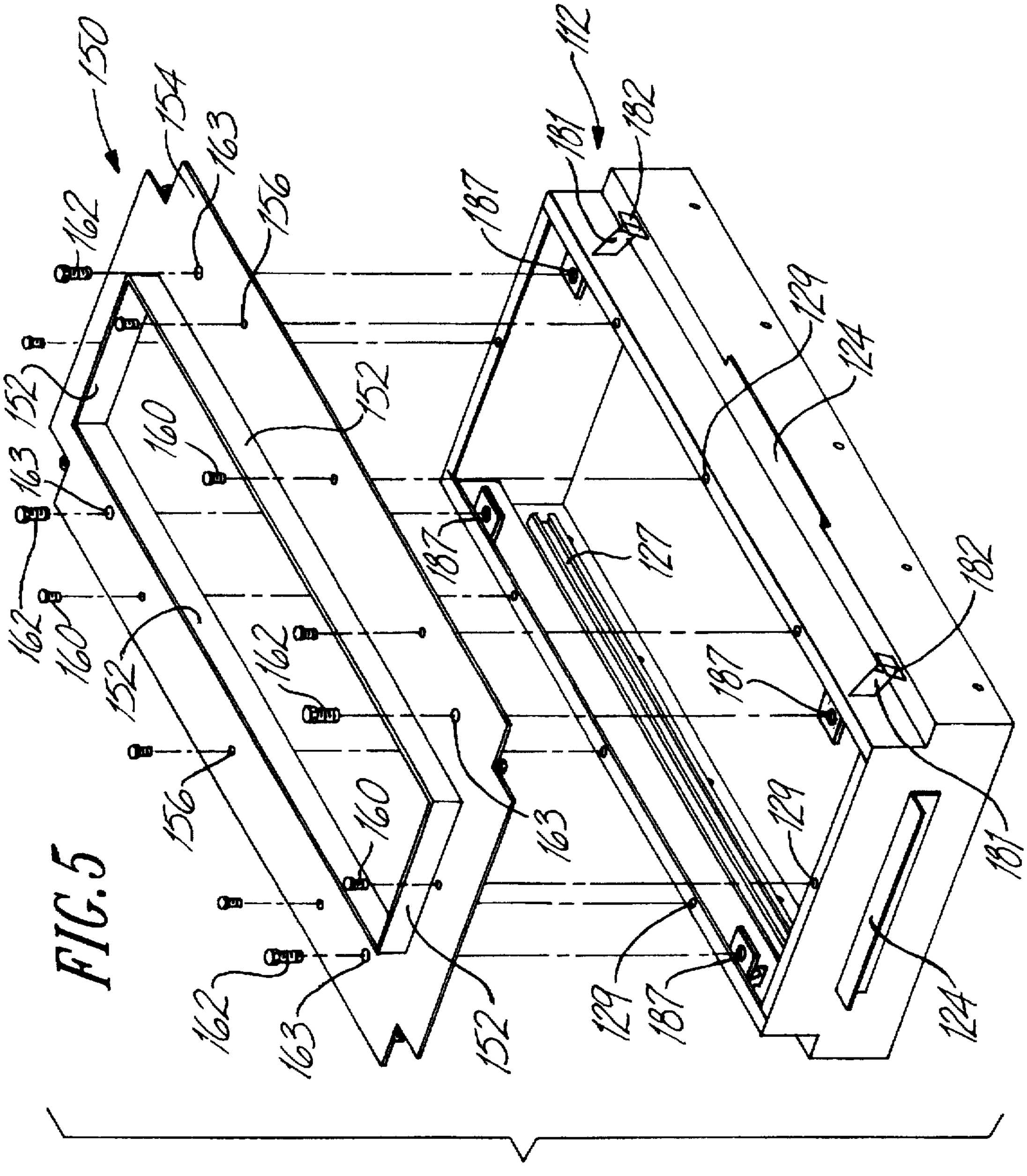
FIG. 5 is an exploded perspective view of a containment box, an anchor frame and a dispenser frame of an alternative embodiment of the present invention.
Figure 6:
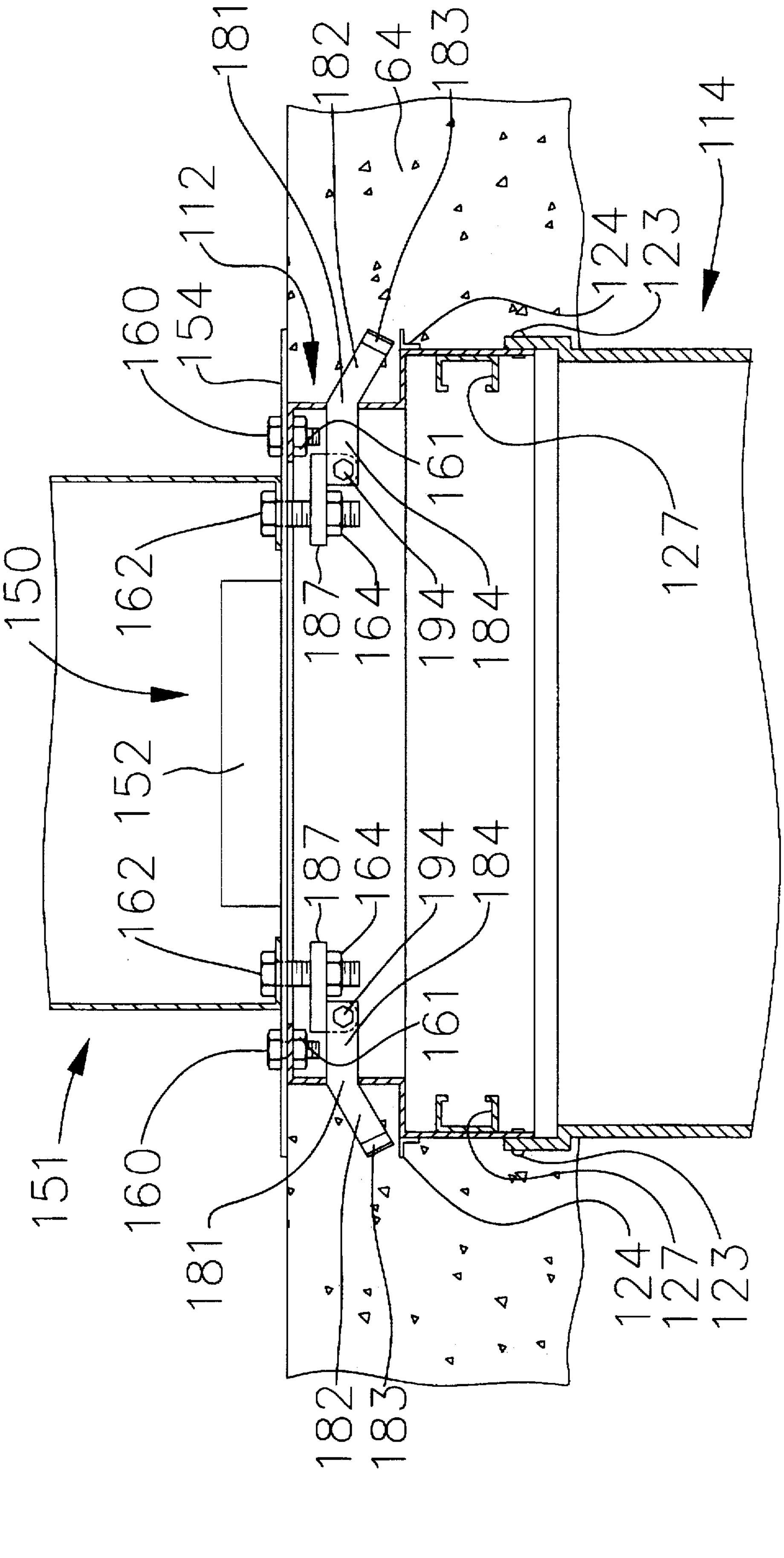
FIG. 6 is a cut away front view of the embodiment of FIG. 5.
Figure 7:
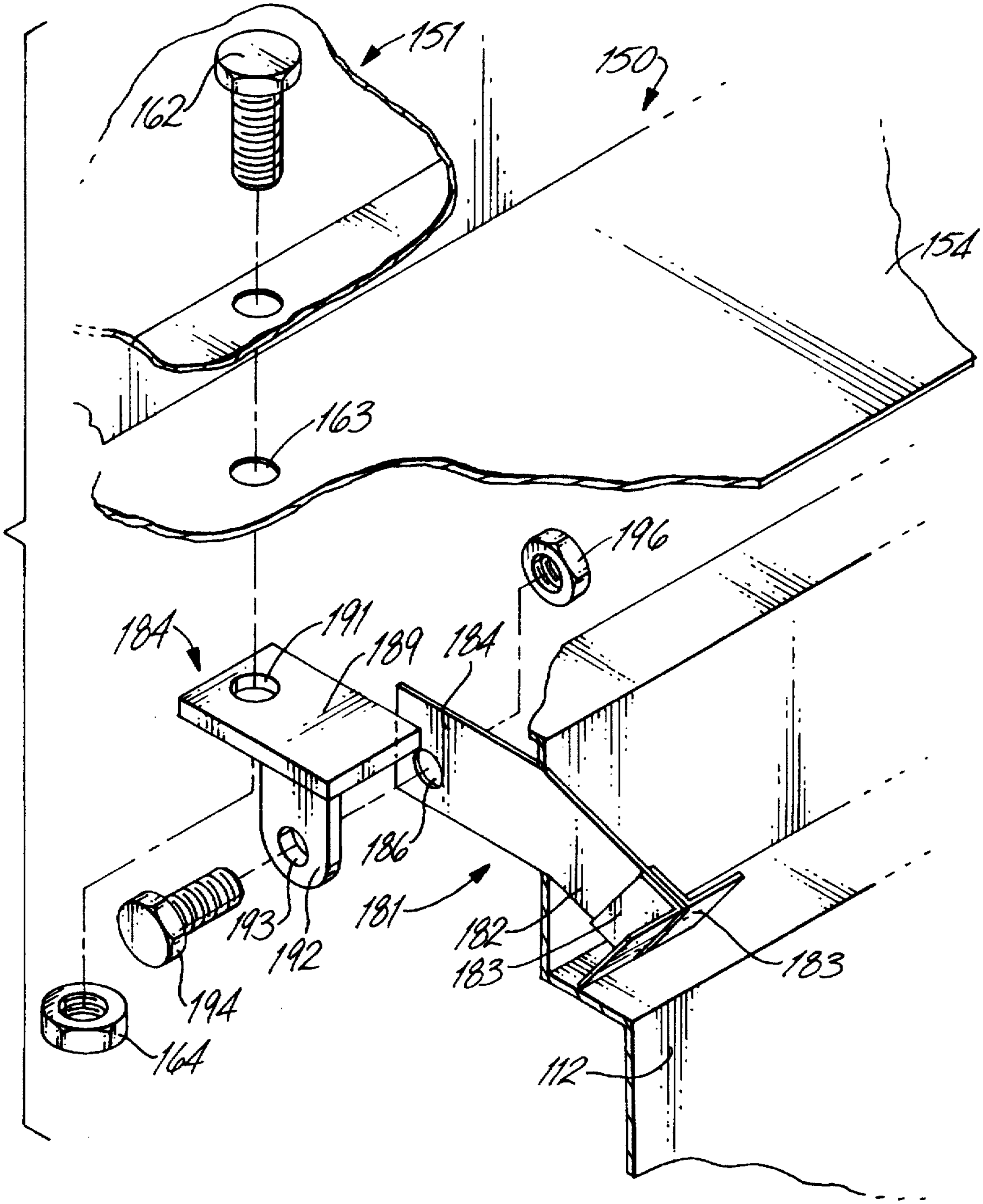
FIG. 7 is an exploded perspective view of the anchoring bracket of FIGS. 5 and 6.

A second preferred embodiment of a combination anchor frame and dispenser frame is illustrated in FIGS. 5–7. According to the second embodiment, an anchor frame 112 is attached to a containment box 114 with a plurality of rivets 123. The anchor frame includes a pair of rails 127 made of channel stock with a C-shaped cross section as described for the first embodiment. According to this embodiment, in addition to a first set of four anchoring brackets provided in the form of anchor blades 124, a second set of anchoring brackets are provided in the form of anchor bars 181 as further illustrated in detail in FIG. 7.

Each anchor bar includes a first arm 182 which extends out from the anchor frame and into the surrounding concrete 64. The first arm extends from near the top of the anchor frame in a downwardly sloping direction so as to be set deep in the concrete. The distal end of each of the first arms includes a pair of lengths of angle stock 183 welded to opposite sides of the end of the arm so as to extend outward from the arm into the concrete to provide still further anchoring of the anchor frame.

Each anchor bar also includes a second arm 184 extending inwardly into the opening of the anchor frame. Preferably, the first and second arms are provided as a unitary piece that is fitted to a slot in the wall of the anchor frame such as by welding. While the first arm slopes downwardly away from the anchor frame, the second arm extends in a generally horizontal direction. A hole 186 in each of the second arms is used to fasten an anchor plate 187 to the anchor bar. The anchor plates are useful for mounting a narrow dispenser frame 150 to the anchor frame.

Except for having a narrower opening, the dispenser frame is similar to that of the first embodiment. The dispenser frame includes four frame walls 152 arranged in a generally rectangular configuration with a flange 154 extending around its base. The dispenser frame and anchor frame include a plurality of mating holes 129, 156 which allow the dispenser frame to be mounted to the anchor frame by a plurality of bolts 160 and nuts 161. The dispenser frame also includes dispenser mounting holes 163 for mounting a dispenser 151 to the dispenser frame. Unlike the dispenser frame of the first embodiment, for this dispenser frame the dispenser holes are located inside the opening of the anchor frame rather than outside.

Because the dispenser holes are inside the opening of the anchor frame, the dispenser is mounted to both the dispenser frame and the anchoring bracket for additional strength. Referring to FIG. 7, a horizontal top plate 189 on the anchor plate includes a first hole 191 for receiving a dispenser bolt 162. Each dispenser bolt extends through the base of the dispenser, through the flange of the dispenser frame and through a first hole of the anchor plate and fastens with a nut 164. Alternatively the first hole can be a threaded hole which eliminates the need for a nut. The anchor plate includes a downwardly extending leg 192 with a second hole 193 for permitting the anchor plate to be bolted to the anchor bar at the hole 186 with a bolt 194 and a nut 196.

As mentioned above, the anchor frame and dispenser frame of the second embodiment are useful for firmly anchoring the dispenser to the surrounding concrete. One advantage of the first embodiment as described previously is that if a dispenser is hit by a customer's car, the dispenser and dispenser frame tend to shear from the anchor frame to minimize damage to the anchor frame and containment box. However, in some installations, if the dispenser shears off from the anchor frame too easily, it can be thrown, causing damage to surrounding equipment. Therefore, for such installations, a more securely mounted dispenser may be desired. According to the second embodiment, if a dispenser is hit, the force of the collision will be borne in large part by the anchor bars which are firmly embedded in the surrounding concrete. Thus the second embodiment tends to prevent the dispenser from easily shearing from the anchor frame.

While a dispenser used with the second embodiment of the invention does not easily shear from the anchor frame, other important advantages are provided. Most important is that the dispenser frame is easily changed if a new size or type of dispenser is desired at an existing installation. If such a change is to be effected, first the dispenser and dispenser frame are removed. Then the anchor plate is removed from the anchor bar. A new dispenser and its corresponding dispenser frame are selected. If the dispenser is another narrow dispenser, a new anchor plate of appropriate dimensions is provided to permit the dispenser to be mounted to the anchor bar. If the new dispenser is of a wider configuration, it can be mounted as described in the first embodiment.

Referring back to the first embodiment as illustrated in FIG. 3, if a wide dispenser is to be mounted on an existing anchor frame and it is desired that the dispenser be more firmly mounted in the concrete than by merely attaching it to the anchor frame, four expansion bolts (not shown) can be used to replace the bolts 62. Instead of a dispenser frame with threaded apertures 63, a dispenser frame with through holes is used. The concrete is drilled in the appropriate locations to accommodate the expansion bolts. Such expansion bolts are well known in the art. They include a threaded socket portion which is inserted into the concrete and into which a bolt can be threaded. The socket can be of a type that is expanded to be firmly set in the concrete by a sharp blow of a hammer to the head of a partially inserted bolt, or of a type that is expanded by tightly threading the bolt into the socket. Of course, a dispenser frame such as that of the first embodiment can also be modified by drilling the threaded apertures 63 to accommodate expansion bolts.

In the most preferred embodiment, anchor bars such as those described in the second embodiment are provided on the anchor frame. If the installation requires the anchoring of the dispenser in concrete, and if a narrow frame is used, anchor plates can be provided as set forth in the second embodiment above. Otherwise, the anchor plates can be eliminated and the dispenser plate can be attached to the anchor frame as set forth for the first embodiment above.

The present invention provides a highly versatile anchor frame assembly which can be used for a broad range of product dispensers. While various embodiments are described above, other variations would be apparent to one skilled in the art. Therefore, the scope of the invention is not to be limited to the specific embodiments described, but by the scope of the following claims.

What is claimed is:

1. A frame assembly for anchoring a containment box with a top opening in a surrounding driveway surface and for removably attaching one of a plurality of different product dispensers to the containment box, the product dispenser including connections for connecting the product dispenser to product piping to be located in the containment box, the frame assembly comprising:

- an anchor frame attached to the top opening of the containment box, the anchor frame including:
  - a plurality of outwardly extending anchoring brackets for anchoring the containment box in the surrounding driveway surface;
  - at least one rail permitting adjustable support of the piping in the containment box; and
  - means for removable attachment of the anchor frame to any one of plurality of different dispenser frames; and
- a dispenser frame including means for removably attaching the dispenser frame to the anchor frame and means for mounting the one of the plurality of product dispensers to the dispenser frame.

2. The frame assembly of claim 1 wherein the anchor frame is integral to the containment box.

3. The frame assembly of claim 1 wherein the anchor frame is permanently attached to the containment box.

4. The frame assembly of claim 1 wherein the anchor frame is removably attached to the containment box.

5. The frame assembly of claim 1 wherein the anchor frame includes a lower portion for fitting within the top opening of the containment box.

6. The frame assembly of claim 1 wherein the outwardly extending anchoring brackets comprise planer anchor blades.

7. The frame assembly of claim 1 wherein the outwardly extending anchoring brackets comprise anchor bars.

8. The frame assembly of claim 1 wherein the dispenser frame includes means for leveling the frame assembly during installation.

9. The frame assembly of claim 1 wherein the leveling means comprises a plurality of leveling nuts.

10. A containment box and frame assembly for attachment to one of a plurality of product dispensers comprising:

- a box assembly for containing fluid spilled from the product dispenser, the box assembly including a top opening;
- a dispenser frame selected from a plurality of dispenser frames, the different dispenser frames for mounting different dispensers to the containment box, the dispenser frame including means for removable attachment to the one of the plurality of product dispensers, and
- an anchor frame attached to the top opening of the box assembly, the anchor frame including a plurality of anchoring brackets for anchoring the containment box in a surrounding driveway surface and means for removable attachment of the anchor frame to the plurality of different dispenser frames.

11. The containment box and frame assembly of claim 10 wherein the anchor frame is integral to the box assembly.

12. The containment box and frame assembly of claim 10 wherein the anchor frame is permanently attached to the box assembly.

13. The containment box and frame assembly of claim 10 wherein the anchor frame is removably attached to the box assembly.

14. The containment box and frame assembly of claim 10 wherein the anchor frame includes a lower portion for fitting within the top opening of the box assembly.

15. The containment box and frame assembly of claim 10 wherein the anchoring brackets comprise anchor blades extending outwardly from the box assembly in a plane parallel to the driveway surface.

16. The containment box and frame assembly of claim 10 wherein the anchoring brackets comprise anchor bars extending outwardly from the box assembly in a generally downward direction.

17. The frame assembly of claim 10 wherein the dispenser frame includes means for leveling the frame assembly during installation.

18. The frame assembly of claim 17 wherein each leveling means comprises a plurality of leveling nuts.

* * * * *